(12) United States Patent
Alshawi et al.

(10) Patent No.: US 7,912,726 B2
(45) Date of Patent: Mar. 22, 2011

(54) METHOD AND APPARATUS FOR CREATION AND USER-CUSTOMIZATION OF SPEECH-ENABLED SERVICES

(75) Inventors: Hiyan Alshawi, Madison, NJ (US); Shona Douglas, Madison, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 11/215,756

(22) Filed: Aug. 30, 2005

(65) Prior Publication Data

US 2006/0004575 A1    Jan. 5, 2006

Related U.S. Application Data

(62) Division of application No. 09/732,600, filed on Dec. 8, 2000, now abandoned.

(51) Int. Cl.
*G10L 21/00* (2006.01)
(52) U.S. Cl. .................................................. 704/270.1
(58) Field of Classification Search .................. 704/7, 9, 704/10, 270.1
See application file for complete search history.

(56) References Cited

U.S. PATENT DOCUMENTS

| | | | |
|---|---|---|---|
| 5,493,692 A * | 2/1996 | Theimer et al. ............... | 455/26.1 |
| 5,530,861 A | 6/1996 | Diamant et al. | |
| 5,544,354 A * | 8/1996 | May et al. .......................... | 707/4 |
| 5,675,707 A | 10/1997 | Gorin et al. | |
| 5,729,659 A | 3/1998 | Potter | |
| 5,974,413 A * | 10/1999 | Beauregard et al. .................. | 1/1 |
| 6,070,142 A * | 5/2000 | McDonough et al. ............ | 705/7 |
| 6,122,614 A | 9/2000 | Kahn et al. | |
| 6,138,100 A | 10/2000 | Dutton et al. | |
| 6,144,375 A * | 11/2000 | Jain et al. ....................... | 715/251 |
| 6,178,404 B1 * | 1/2001 | Hambleton et al. .......... | 704/275 |
| 6,292,779 B1 * | 9/2001 | Wilson et al. ................. | 704/257 |
| 6,311,159 B1 | 10/2001 | Van Tichelen et al. | |
| 6,324,512 B1 | 11/2001 | Junqua et al. | |
| 6,327,346 B1 * | 12/2001 | Infosino ..................... | 379/88.02 |
| 6,327,566 B1 | 12/2001 | Vanbuskirk et al. | |
| 6,341,372 B1 | 1/2002 | Datig | |
| 6,397,212 B1 * | 5/2002 | Biffar ........................... | 707/704 |

(Continued)

FOREIGN PATENT DOCUMENTS

JP    11259089    9/1999

(Continued)

OTHER PUBLICATIONS

PTO-892 attached to Office Action dated Nov. 28, 2005 of co-pending CIP U.S. Appl. No. 10/103,049, filed Mar. 22, 2002.

(Continued)

*Primary Examiner* — Michael N Opsasnick

(57) ABSTRACT

Embodiments of the invention relate to a system and method for providing speech-enabled application programs. The speech-enabled programs automatically execute requests input by users. One or more natural language variants may be mapped with at least one natural language exemplar. The natural language exemplar may correspond to a typical way to express a request relevant to the speech-enabled application program. The natural language variant may correspond to an alternative way of expressing the same request. A recognized input string is received and a prospective variant that most resembles the received recognized input string is selected from the natural language variants. The natural language exemplar mapped to the prospective variant is identified. An action instruction associated with the identified natural language exemplar is executed to fulfill the user's request.

15 Claims, 6 Drawing Sheets

U.S. PATENT DOCUMENTS

| | | | | |
|---|---|---|---|---|
| 6,408,272 | B1 * | 6/2002 | White et al. | 704/270.1 |
| 6,453,292 | B2 * | 9/2002 | Ramaswamy et al. | 704/235 |
| 6,658,388 | B1 * | 12/2003 | Kleindienst et al. | 704/275 |
| 6,684,183 | B1 * | 1/2004 | Korall et al. | 704/9 |
| 6,701,362 | B1 * | 3/2004 | Subramonian et al. | 709/224 |
| 6,745,165 | B2 * | 6/2004 | Lewis et al. | 704/275 |
| 6,748,361 | B1 * | 6/2004 | Comerford et al. | 704/275 |
| 6,922,670 | B2 | 7/2005 | Yamada et al. | |
| 7,249,159 | B1 * | 7/2007 | Horvitz et al. | 709/206 |
| 7,496,943 | B1 * | 2/2009 | Goldberg et al. | 725/22 |
| 2002/0107838 | A1 | 8/2002 | Tsai | |
| 2002/0164000 | A1 * | 11/2002 | Cohen et al. | 704/275 |

FOREIGN PATENT DOCUMENTS

| | | |
|---|---|---|
| JP | 2000259628 | 9/2000 |
| WO | WO 94/16437 | 7/1994 |

OTHER PUBLICATIONS

EPO Search Report dated Mar. 1, 2005, of corresponding European Patent application No. EP 01 31 0087, 3 pages.

Nagy D., et al: "Automated Language Acquisition in Multimodal Environment" 2000 IEEE Int'l Conf. on Multimedia and Expo. ICME2000. Proceedings. Latest Advances in the Fast Changing World of Multimedia, IEEE Piscataway, NJ, USA, vol. 2, Jul. 30, 2000, pp. 937-940.

Arai, K., et al: "Grammar Fragment Acquisition Using Syntactic and Semantic Clustering", Speech Communication Elsevier Netherlands, vol. 27, No. 1, 1999, pp. 43-62.

Gorin, A.: "On Automated Language Acquisition", Journal of the Acoustical Society of America, American Institute of Physics, NY, US, vol. 97, No. 6, Jun. 1995, pp. 3441-3461.

McNair, A.E., et al: "Improving Recognizer Acceptance Through Robust, Natural Speech Repair"., ICSLP 94 : 1994 International Conference on Spoken Language Processing. Yokohama, Japan, Sep. 18-22, 1994, vol. 3, pp. 1299-1302.

Scott Miller, David Stallard, Robert Bobrow, and Richard Schwartz, "A Fully Statistical Approach to Natural Language Interfaces", In Proceedings of the 34th Annual Meeting of the Association for Computational Linguistics, 1996, pp. 55-61.

Roberto Pieraccini, Esther Levin and Enrique Vidal, "Learning How to Understand Language", Proceedings of Eurospeech-93, 3rd European Conference on Speech Communication and Technology, 1993, consists of 6 unnumbered pages.

J. H. Wright, A. L. Gorin and G. Riccardi, "Automatic Acquisition of Salient Grammar Fragments for Call-Type Classification", In Proceedings of the 5th European Conference on Speech Communication and Technology, 1997, 4 unnumbered pages.

* cited by examiner

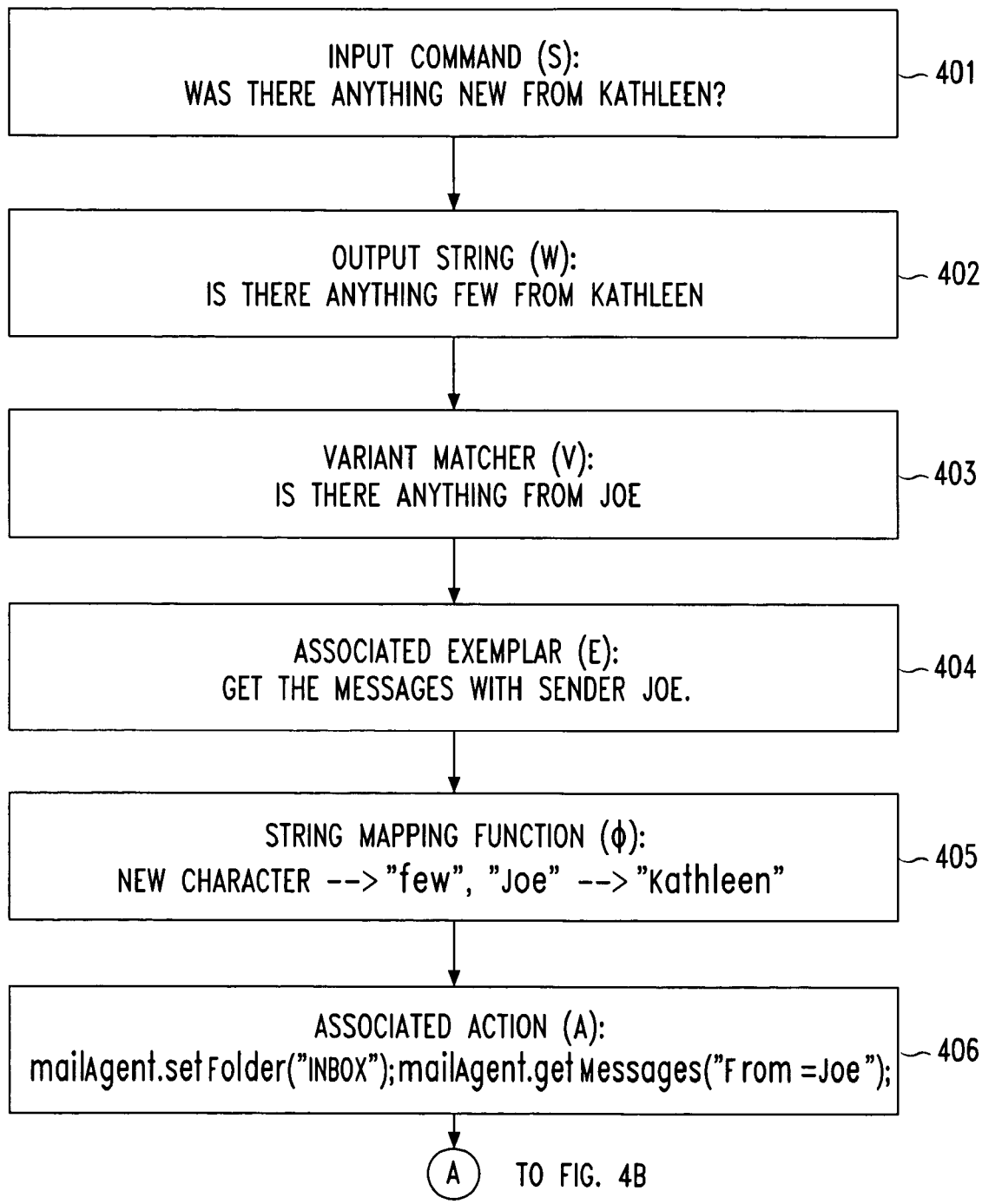

METHOD AND APPARATUS FOR CREATION AND USER-CUSTOMIZATION OF SPEECH-ENABLED SERVICES

CROSS REFERENCE TO RELATED APPLICATIONS

This application is a divisional application of U.S. patent application Ser. No. 09/732,600, filed Dec. 8, 2000 now abandoned by Alshawi et al., which is herein incorporated by reference in its entirety.

FIELD OF THE INVENTION

This invention relates generally to speech recognition technology. More particularly, the invention relates to development and customization of spoken language interfaces for a plurality of speech-enabled systems and sub-systems.

BACKGROUND OF THE INVENTION

In recent years, the desire to use speech-enabled systems has increased. Speech recognition technology has been applied to a variety of interactive spoken language services to reduce costs. Services benefiting from a spoken language interface may include, for example, services providing products and/or services, e-mail services, and telephone banking and/or brokerage services. Speech-enabled systems permit users to verbally articulate to the system a command relating to desired actions. The speech-enabled system recognizes the command and performs the desired action.

Typically, the underlying technologies utilized in such speech-enabled systems include, for example, speech recognition and speech synthesis technologies, computer-telephony integration, language interpretation, and dialog and response generation technologies. The role of each technology in speech-enabled systems is described below briefly.

As is known, speech recognition technology is used to convert an input of human speech into a digitized representation. Conversely, speech synthesis takes a digitized representation of human speech or a computer-generated command and converts these into outputs that can be perceived by a human—for example, a computer-generated audio signal corresponding to the text form of a sentence.

Known computer-telephony integration technology is typically used to interface the telephony network (which may be switched or packed-based) to, for example, a personal computer having the speech recognition and speech synthesis technologies. Thus, the computer-telephony platform can send and receive, over a network, digitized speech (to support recognition and synthesis, respectively) to and from a user during a telephony call. Additionally, the computer-telephony integration technology is used to handle telephony signaling functions such as call termination and touch-tone detection.

Language interpretation systems convert the digitized representation of the human speech into a computer-executable action related to the underlying application and/or service for which the spoken language interface is used—for example, a speech-enabled e-mail service.

The dialog and response generation systems generate and control the system response for the speech-enabled service which may correspond to, for example, the answer to the user's question, a request for clarification or confirmation, or a request for additional information from the user. The dialog and response systems typically utilize the speech synthesis systems or other output devices (e.g., a display) to present information to the user. Additionally, the dialog and response generation component may be responsible for predicting the grammar (also called the "language model") that is to used by the speech recognizer to constrain or narrow the required processing for the next spoken input by the user. For example, in a speech-enabled e-mail service, if the user has indicated the need to retrieve messages, the speech recognizer may limit processing for possible commands relating to retrieving messages the user may use.

Using one conventional method, language interpretation an dialog and response generation are mediated by intermediate representations, often referred to as semantic representations. These representations are computer data structures or code intended to encode the meaning of a sentence (or multiple sentences) spoken by a user (e.g., in a language interpretation system), or to encode the intended meaning of the system's response to the user (e.g., in a dialog and response generation system). Various types of such intermediate semantic representations are used including hierarchically embedded value-attribute lists (also called "frames") as well as representations based on formal logic.

To facilitate this intermediate representation process, a two-step process is typically used. First, the language interpretation component converts the recognized word sequence (or digitized representation) into an instance of the intermediate semantic representation. Various means have been used for this conversion step, including conversion according to rules that trigger off of keywords and phrases, and conversion according to a manually written or statistically trained transition network. Second, the resulting intermediate representation is then mapped into the actual executable application actions. This second conversion phase is often achieved by an exhaustive set of manually authored rules or by a computer program written specifically for this spoken language application. This approach requires programming experts familiar with the speech-enabled interfaces and programming experts familiar with the underlying application programs. As a result, speech-enabled interfaces using this approach can be very expensive to develop and/or customize.

Alternatively, another conventional method uses customized software modules for interfacing with the language interpretation system to determine which application-specific action to execute for a given recognized input sequence. Using this approach, customized software modules need to be developed for each application and for handling the various application-specific commands. As a result, this conventional approach for developing speech-enabled interfaces can be costly due to increased development times.

Using conventional approaches, development of speech-enabled services requires skills different from, and in addition to, skills needed for programming the underlying application program for the service. Even for skilled spoken language system engineers, development of robust interfaces can be difficult and time-consuming with current technology. This increases the development time for such services and more generally slows widespread adoption of spoken language interface technology.

Since these conventional approaches require specialized programming skills, customizing these speech-enabled services, by users, base on personal language preferences, if at all possible, can be very difficult.

What is needed is a system and method for creating and customizing speech enabled services that may solve the difficulties encountered using conventional approaches. For example, what is needed is an efficient speech-enabled interface that is not only robust and flexible, but can also be easily customized by users so that personal language preferences can be used.

SUMMARY OF THE INVENTION

Embodiments of the invention relate to a system and method for providing speech-enabled application programs. The speech-enabled programs automatically execute requests input by users. One or more natural language variants may be mapped with at least one natural language exemplar. The natural language exemplar may correspond to a typical way to express a request relevant to the speech-enabled application program. The natural language variant may correspond to an alternative way of expressing the same request. A recognized input string is received and a prospective variant that most resembles the received recognized input string is selected from the natural language variants. The natural language exemplar mapped to the prospective variant is identified. An action instruction associated with the identified natural language exemplar is executed to fulfill the user's request.

In embodiments of the invention, users of the system can create a plurality of personalized natural language variants that represent preferred ways of expressing the desired requests. Accordingly, the system may be able to recognize the plurality of variants and execute the action as specified by the user's request.

The above and other features and advantages of the present invention will be readily apparent and fully understood from the following detailed description of preferred embodiments, taken in connection with the appended drawings.

BRIEF DESCRIPTION OF THE DRAWINGS

FIGS. 4A and 4B show a flow chart illustrating an exemplary method in accordance with an embodiment of the present invention.

DETAILED DESCRIPTION OF PREFERRED EMBODIMENTS

Embodiments of the present invention relate to the creation, development and customization of spoken language interfaces for a plurality of speech-enabled services. The invention provides a natural language interface to permit programmers and users to create and/or customize spoken language interfaces. The invention may provide an efficient and cost-effective way of developing spoken language interfaces that can be easily adapted to different systems or services—for example, messaging systems, auction systems, or interactive voice recognition (IVR) systems. Advantageously, the spoken language interface can be easily customized by end users based on their personal preferences and speech habits.

Embodiments of the present invention may use natural-language to natural-language mapping between user-specified commands and commands specified by, for example, an application program developer. Embodiments of the present invention provide an efficient system for executing a plurality of user commands that may map to a finite number of executable actions as specified by the program developer. Accordingly, the program developer may need only specify a finite number of exemplary English (or other language) commands that may be related to application actions. These exemplary English commands may be mapped with a plurality of English variations that a user may use for the desired action. The user can customize the English variations to create preferred commands to execute a desired action.

Figure 1:
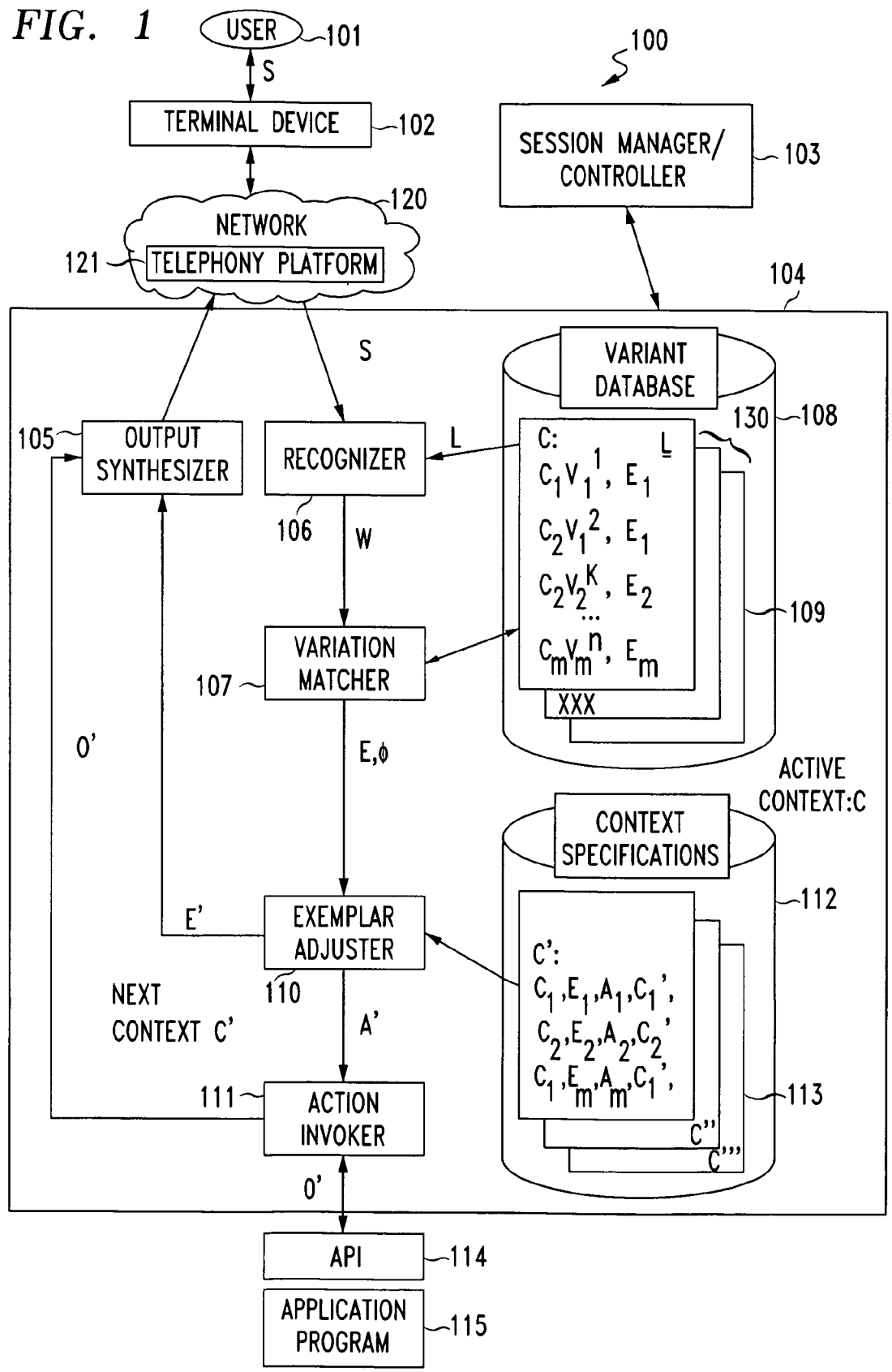
FIG. 1 is a diagrammatic representation of a system in accordance with embodiments of the present invention.

Referring to FIG. 1, a block diagram of a speech-enabled system in accordance with embodiments of the present invention is shown. User 101 may use terminal device 102 for access to the application program 115. The terminal device 102 may be, for example, a personal computer, a telephone, a mobile phone, a hand-held device, personal digital assistant (PDA) or other suitable device having suitable hardware and/or software to connect with network 120 and access application program 115. Terminal device 102 may be installed with suitable hardware and software, for example, an Internet browser and a modem for connection to the Internet.

Network 120 may include, for example, a public switched telephone network (PSTN), a cellular network, an Internet, an intranet, satellite network and/or any other suitable national and/or international communications network or combination thereof.

Network 120 may include a plurality of communications devices (e.g., routers, switches, servers, etc.) including at least one computer telephony platform 121. Platform 121 may be a high-capacity computer and/or server that has the capacity to send, receive, and/or process digitized speech (e.g., to support speech recognition and synthesis functions). Platform 121 may be equipped to interface with a switch-based or packet-based network 120. Additionally, platform 121 may be equipped with telephony interface to handle telephony signaling functions such as call termination and touch tone detection. Platform 121 may be located within the network 120 or, alternatively, it may be located outside network 120. Platform 121 may serve as a gateway interface to spoken language processor (SLP) 104. Platform 121 may receive data from terminal device 102 and dispatch this information to SLP 104. Conversely, platform 121 may dispatch data from SLP 104 to the terminal device 102.

In accordance with embodiments of the invention, SLP 104 may be coupled to network 120 to provide a speech-enabled interface for an application programming interface (API) 114 and corresponding application or service 115. Application program 115 may support services or systems, for example, messaging systems, auction systems, interactive voice recognition (IVR) systems, or any other suitable system or service that may utilize a spoken language interface for automation. API 114 may be a software interface that application 115 may use to request and carry out lower-level services performed by a computer's or telephone system's operating system. An API 114 may include, for example, a set of standard software interrupts, calls, and data formats used by application program 115 to interface with network services, mainframe communications programs, telephone equipment or program-to-program communications.

In embodiments of the invention SLP 104 may include a plurality of components, for example, an output synthesizer 105, recognizer 106, variation matcher 107, variant database 108, exemplar adjuster 110, action invoker 111 and context specifications database 112. It is recognized that output synthesizer 105 may provide data that can be presented to user's terminal device 102.

Output synthesizer 105 and recognizer 106 are known per se. Output synthesizer 105 may be a speech synthesizer or display formatter for delivering information to the user 101. The display formatter may produce data suitable for presentation on any physical display, for example, a cathode ray tube (CRT), liquid crystal display (LCD), flat plasma display, or any other type of suitable display. Alternatively or additionally, any suitable speech synthesizer that can take unrestricted text or digital data as input and convert this text or data into an audio signal for output to the user 101 may be used in embodiments of the invention.

Recognizer 106 may receive a natural language request in the form of, for example, an audio or analog signal S from user 101 and may convert this signal into a digitized data string or recognized word sequence, W. Signal S may be converted by the terminal device 102 and/or platform 121 to travel across network 120 and is delivered to recognizer 106. Digitized data string W may represent the natural language request S in the form of a digital signal as output by recognizer 106. For example, W may be a sequence of words in text form. Recognizer 106 may use any known process or system to convert signals S into a data string W. IN one embodiment, recognizer 106 can load and switch between language models dynamically. For simplicity, the English language is referred to herein as the spoken language for use with the speech-enabled services. However, the present invention can be applied to spoken language interfaces for other languages.

In alternative embodiments of the invention, the user's terminal device 102 may include a handwriting recognition device, keyboard, and/or dial pad the user 101 may use to input a command and generate signal S. The generated signal S may be delivered to the recognizer 106 and processed as described above.

Advantageously, in accordance with embodiments of the present invention, variation matcher 107 may user variation database 108 and a variation matching function (not shown) to map the digitized data string W (or the recognized word sequence) into an exemplary English sentence E (i.e., an exemplar). The exemplar E may correspond to a typical way, as defined by an applications developer, of phrasing a particular request relevant to the current application program 115. The variation matcher 107 may further computer a string mapping function φ that may indicate the difference in meaning between the recognized digitized data string W and the exemplar E.

In embodiments of the invention, variant database 108 may contain a language model (L) 130 related to a particular context and/or the application program or service 115, currently accessed by the user 101. The language model 130 may be derived from the plurality of variant command files 109 using techniques known in the art for generating speech recognition language models from collections of sentences. In embodiments of the invention, each file 109 may be pertinent to particular context C corresponding to language model 130. It is recognized that variant database 108 may contain a single language model 130 relating to a particular application program or, alternatively, may contain a plurality of language models 130 relating to various application programs.

Variant command file 109 for context C may contain for example, an exemplar E1 related to context C and associated variants $V_1^1$ to $V_1^n$. For each exemplar E in a context C, there may be a collection of, for example, English variants $V_1^1$–$V_1^n$. These variants V, together with their associated exemplars E, are stored in the variant database 108. The database 108 may store a set of related data of the form (C, V, E), where each V is an alternative way to phrase in natural language a request for the action A that is associated with exemplar E in context C. Since exemplars E may also be valid ways of phrasing application actions A, they are included in the variant database 108 as "variants" of themselves.

In embodiments of the invention a set of exemplars $E_1$ to $E_m$ associated with the particular context C of an application program may be provided by the developer of the spoken language interface or of the application program. The developer may be an expert in the application API 114. The developer need not be an expert in speech-enabled services. Each exemplar E may represent an exemplary way of phrasing, in English or any other suitable language, a particular executable command or action for context C (as will be discussed below or in more detail). The developer may map exemplar E to action A. For a particular context C, each file 109 may contain a plurality of English variants $V_1^1$–$V_m^n$. Variants $V_1^1$–$V_1^n$ may represent different ways of saying or representing corresponding exemplar $E_1$; variants $V_2^1$–$V_2^k$ may represent different ways for saying exemplar $E_2$; etc. These variants $V_1^1$–$V_m^n$ may be created by anyone without requiring any relevant expertise or knowledge of the application program and/or speech-enabled technologies. For example, the user 101 may create variant $V_1^1$ that represents the manner in which the user 101 typically refers to the desired action represented by exemplar $E_1$. In embodiments of the present invention, the created variant(s) $V_1^1$–$V_1^n$ may be mapped to its associated exemplar $E_1$ for a particular context C, for example, in the form (C, V, E), as indicated above.

As a specific example, C may correspond to the context of reading e-mail messages, $E_1$ may be the exemplar "Retrieve my mail message", and the variants may include, for example, $V_1^1$ "get my mail", $V_1^2$ "fetch my e-mail", $V_1^3$ "fetch messages".

Referring again to FIG. 1, context specifications database 112 may contain a set of exemplar action specification files 113 for one application program or a plurality of different application programs. Exemplar action files 113 may correspond and/or relate to variant files 109. For example, the variants in a variant file 109 may be used to express the actions A in a corresponding action file 113, and A may be available for execution by action invoker 111.

For a given context C in exemplar action specification files 113, certain application actions A may be valid. These actions may relate to a specific context for a given application program. In embodiments of the present invention, exemplar-action specification file 113 may contain a plurality of contexts $C_1$–$C_m$, a plurality of associated exemplars $E_1$–$E_m$, associated actions $A_1$–$A_m$, and pointer to a next context C'–$C^x$. Accordingly, each exemplar-action specification file 113 may contain a list of "exemplar-action" records stored or correlated as (C, E, A, C'). Each record (C, E, A, C') may associate the exemplar E with a sequence A of action strings in the command language executable by the action invoker 111 in context C, and an identifier C' of another, or the same, application context specification.

In embodiments of the present invention, each exemplary action specification file in the set of files 113 may correspond to a stage of interaction with the user. For example, if the application program is a speech-enabled e-mail service, the first action specification file 113 may contain actions relating to logging on, or identification of the user to the service, and a second action specification file 113 may contain actions relating to sending or retrieving e-mail messages. Thus, once the user 101 has accessed the service, action specification file 113 related to actions required to identify the user may be activated, followed by activating the action specification file for, for example, retrieving e-mail messages. The second action specification file may contain exemplars E and associated A relating to retrieving messages, for example, retrieving new messages, retrieving previously read messages, etc.

A language model L for use by the speech recognizer may be built for each context, based on the variants specified for that context. These models may be augmented with lists of proper names that may be used instead of those present in the exemplars E and variants V. Standard techniques for language modeling can be used for deriving the language models form the sets of variants.

Although, in FIG. 1, variant database 108 and context specification database 112 are shown as two different databases, it is recognized that variant database 108 and context specification database 112 may be consolidated into a single database. It should be noted that descriptions of data flow and data configuration in databases 108 and 112 are given by way of example and variations may be made by one of ordinary skill in the art. For example, variations to the variant command files 109 or configuration or flow of the included data (e.g., C, V, E) and/or to the exemplar action specification files 113 may be made by one of ordinary skill in the art.

In one embodiment, recognizer 106 may produce a digitized data string W that matches exemplar E or variant V, stored in the variant database 108, exactly and the system can then proceed with invoking the corresponding application action A. In alternative embodiments, an exact match between data string W and a corresponding exemplar E or variant V may not be found. For example, recognition errors, requests for actions involving different objects (e.g., using different names) from those in the exemplars E or variants V, linguistic variation in the user utterances (including variants form their own customizations) and/or any combination of variations thereof may prevent exact matches from being found.

In embodiments of the invention, variation matcher 107 may seek to select a prospective variant V, in active context C, that most resembles, or most closely matches, the natural language request as represented by digitized data W. Variation matcher 107 may also specify the necessary changes or adaptations (i.e., string mapping function $\phi$) to be made to, for example, variation matcher. Any known technique may be used to determine whether, for example, a given text or data sequence (e.g., a prospective variant) most resembles or closely matches the recognized word sequence. For example, known mathematical algorithms (as described below) may be applied to find such matches.

In embodiments of the present invention, exemplar adjuster 110 may receive the exemplar E and string mapping function $\phi$ from the variation matcher 107. Exemplar adjuster 110 with input from context specifications database 112 may apply the string mapping function $\phi$ to an application action A (an API call) that is paired with the exemplar E (e.g., from the context specifications database) to produce the actual API call or adapted action A'. Adapted action A' may then be executed by the action invoker 111 to carry out the user's request.

Exemplar adjuster 110 may apply necessary adaptations to the action strings A to be invoked by the application and to the exemplar E (e.g., for confirmation purposes).

In embodiments of the present invention, variation matcher 107 may compute a function f taking an input W and a sequence $<(V_1, E_1), \ldots, (V_n, E_n)>$ of pairs of strings. The output of f may be one of the input pairs $\{(V_i, E_i)\}$ together with a string mapping function $\phi$, that is:

$$f(W, <(V_1, E_1), \ldots, (V_n, E_n)>) \rightarrow (V_i, E_i, \phi)$$

The selected pair $(V_i, E_i)$ may be the first pair in the input sequences for which a string distance function $\mu$ is minimal:

$$\min_{1 \leq j \leq i-1} \mu(W, V_j) > \mu(W, V_i) \leq \min_{i+1 \leq k \leq n} \mu(W, V_k)$$

String mapping function $\phi$ may include a sequence of string editing operations, specifically insertions, deletions, and substitutions.

Exemplar adjuster 110 may fetch the action Ai associated with the exemplar $E_i$, where I may be any integer from 1 to m.

A second string mapping function $\phi'$ may be derived from $\phi$, including only those string editing operations that are valid transformations of the action string Ai. A valid transformation may be one that results in an action string A that is well formed in the sense that it is parsed successfully by the action invoker 111. Second string mapping function $\phi'$ is then applied to both sides of the selected pair by the exemplar adapter 110 to produce the "adapted" pair $\{(E'l, A'i)\}$.

In one embodiment of the variation matcher 107, the string distance $\mu$ is the string edit distance and $\phi$ is the corresponding edits found by the dynamic programming algorithm used to computer the minimal edit distance. Such edit-distance computation algorithms are known in computer science and have been used in various applications such as document search and evaluating the outputs of speech recognition systems. In this embodiment, language and action strings may both be treated as sequences of tokens (typically words in the case of language strings).

Edit-distance functions rely on a table of token distances for use when comparing tokens. Token distances can be uniform (e.g., two words that are different have a token distance of 1 and identical tokens have a distance of 0). Alternatively, token distances can be provided in the form of a table that reflects the closeness in meaning between any two words.

In an alternative embodiment of a variation matcher 107, edit-distance matching may be used in conjunction with a natural language generation component. Natural language generators are known per se. Natural language generators may be used to apply linguistic principles to generate a set of paraphrases, or close paraphrases, of English sentences. Such linguistic principles include syntactic transformations (e.g., the active-passive transformation) and paraphrases based on lexical semantics (e.g., "A sells X to B" is the same as "B buys X from A"). In this embodiment of the variation matcher 107, a natural language generator may first be used to produce paraphrases of each of the variants present in a context. This may result in an expanded set of variants for the context to which edit-distances matching may then be applied as indicated above. In embodiments, natural language generators may be used to automatically generate at least one variant V by generating paraphrases of an exemplar E.

Although only two embodiments of a variation matcher 107 have been described, it is recognized that alternative techniques may be applied in the variation matcher. For example, any suitable method that can measure the difference in meaning between two sentences and represent that difference as a string mapping function can be used as the basis for a variation matcher.

The Action invoker 111 may be a command string interpreter capable of executing dynamically generated strings (e.g., method calls and database query requests) corresponding to actions in the API for the application. For example, the command interpreter may execute scripting languages (e.g., TCL), or procedure calls for languages with reflection (e.g., Java), or database query languages (e.g., SQL).

In embodiments of the present invention, the exemplar adjuster 110 can ask user 101 for confirmation that adapted exemplar E' may express the action that is desired by the user 101. If the user confirms positively, the action invoker 111 may dispatch adapted action A' to API 114. Application program 115 may execute the dispatched action and return the resulting output O' to the action invoker 111. The session manager 103 may present output O' to the user via output synthesizer 105.

Session manager or controller 103 may be coupled with SLP 104 and may manage the plurality of components within the SLP 104. For example, session manager 103 may provide data flow control for the various components of SLP 104 during a speech-enabled session. At any point in interacting with a user, the session manager 103 may maintain an active context C. There may be an initial context specification associated with each program application. Each context specification may be associated with a collection of variants in the variant database 108. Although session manager 103 is shown external to SLP 104, it is recognized that alternatively session manager 103 may be incorporated within SLP 104.

Figure 2:
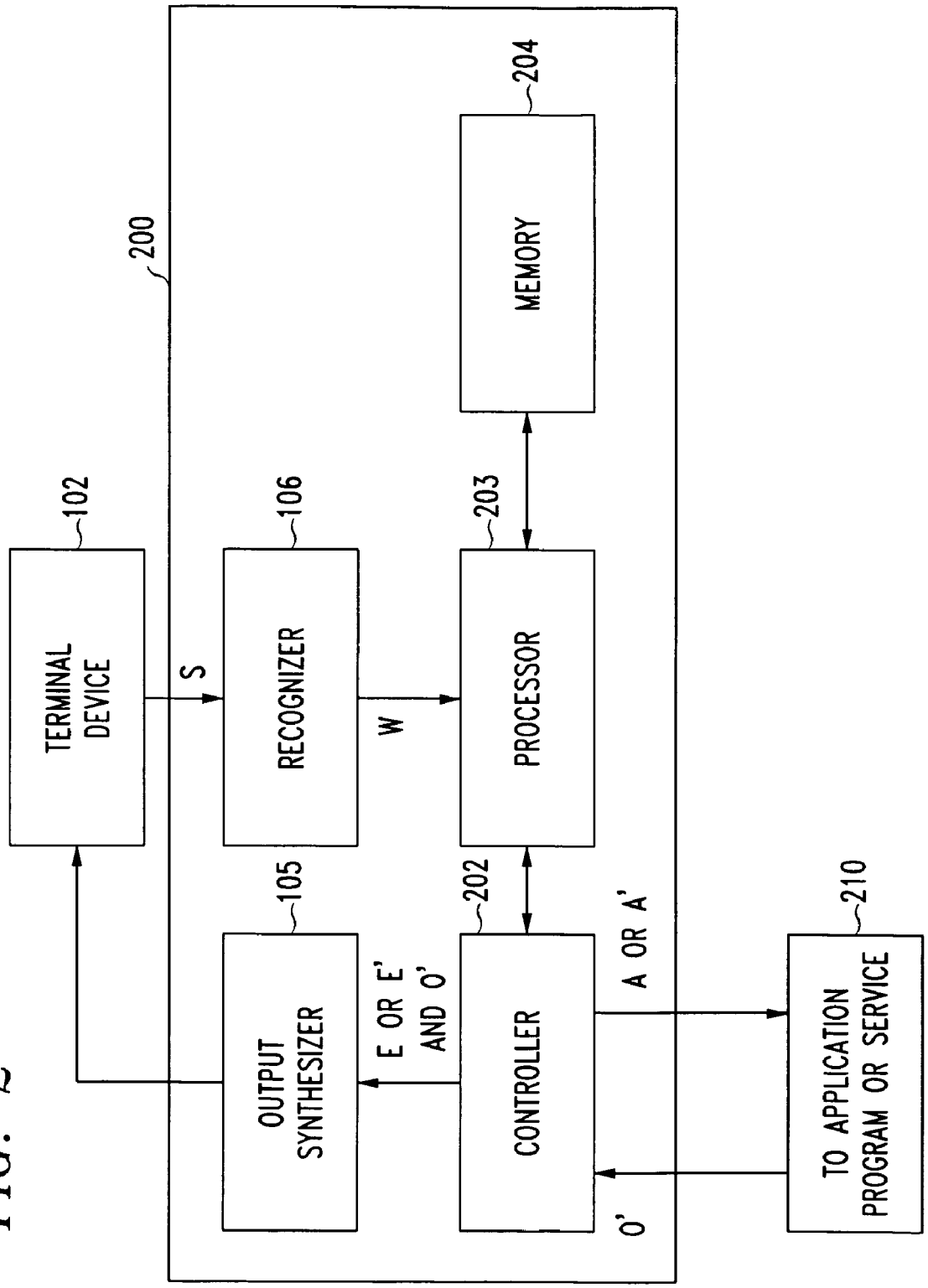
FIG. 2 is a block diagram illustrating a system in accordance with an embodiment of the present invention.

FIG. 2 is a component-level block diagram of a spoken language processing system 200 in accordance with an embodiment of the present invention. The spoken language processing system 200 may be used as the speech-enabled interface for a desired service 210. Thus, using the spoken language processing system 200, a user or customer may, for example, input command S to be executed by the service 210. The user may input command S using terminal device 102. The user may articulate a spoken command into a microphone of, for example, the terminal device 102 (e.g., a telephone, PC, or other communication device). In alternative embodiments of the invention, for example, the terminal device 102 may include handwriting recognition system, a dial pad, a touch screen or keyboard or other input device that the user 101 may use to input command S.

A recognized input string W may be generated by the speech recognizer 106. The recognized input string W may be in the form of digitized data that represents a command (S) input by a user. The recognizer may be located internal to or external to the natural language processing system 200. The recognizer 106 may be coupled to a processor 203 located in the spoken language system 200 of the present invention. The processor may perform the functions of, for example, variation matcher 107, exemplar adjuster 110, action invoker 111, and/or perform other processing functions that may be required by the system 200. In embodiments of the present invention, the processor 203 may process the command S that is input by the user to generate recognized input string W.

Processor 203 may be coupled to a memory 204 and controller 202. The memory 204 may be used to store, for example, variant database 108, context specification database 112, and/or any other data or instructions that may be required by processor 203 and/or controller 202. It is recognized that any suitable memory may be used in system 200. The database 108 and/or 112 may be organized as contexts related to the desired service. Accordingly, depending on the service accessed or the state of service, the processor may load the proper context. In embodiments of the invention, processor 203 may use the variation database and a variation matching function to map the recognized input string W into an exemplary natural language exemplar E, stored in the variant database 108 in memory 204. As described above, the exemplar E, stored in the variant database 108 in memory 204. As described above, the exemplar E may correspond to a typical way of phrasing a particular request relevant to the current application.

In embodiments of the present invention, at least one natural language exemplar E may correspond to one or more natural language variants V. These natural language variants V may represent alternative ways to express exemplar E. These variants may also be stored in the variant database 108 and may be created by, for example, the user, application programmer, and/or speech interface developer. In this case, processor 203 may select, form the one or more natural language variants V, a prospective variant that most resembles or closely matches the recognized word sequence using any known technique for matching as described above. After the selection is made, the corresponding natural language exemplar E may be identified.

In any case, if an exact match for the natural language exemplar E corresponding to the recognized input string W is identified, the processor may identify an application action A (API call) corresponding to the exemplar E. Action A and corresponding exemplar(s) may be stored in, for example, context specification database 112 stored in memory 204. After the action A has been identified, controller 202 may cause the action A to be invoked by service 210.

In alternative embodiments, if there exists a difference between the recognized word sequence W and the natural language exemplar E or between the recognized word sequence W and the natural language variant V, the processor 203 may also generate string mapping function $\phi$. String mapping function $\phi$ may specify the difference between the recognized word sequence W and the natural language exemplar E or between the recognized word sequence W and the natural language variant V. In this case, the processor 203 may then apply the string mapping function $\phi$ to the application action A that corresponds with the exemplar E, to produce the actual API call or adapted action A'. The controller 202 may cause the actual API call A' to be executed by the service 210 to carry out the user's request.

In alternative embodiments of the invention, the processor may apply the string mapping function $\phi$ to the exemplar E to produce the adapted exemplar E'. The adapted exemplar E' may be presented to the user via output synthesizer 105. The user may be asked to confirm whether the action desired by the user may be expressed by exemplar E or adapted exemplar E'. If the user accepts E or E', the controller 202 executes action A or adapted action A', respectively. If the user does not accept E or E', then the processor 203 may continue processing the recognized input string W, as described above, until the user's request has been carried out. In alternative embodiments, if the user does not accept E or E', the controller may ask the user to rephrase their request.

Application program 210 may execute the action A or adapted action A' and return the resulting output O' to the controller 202. The controller 202 may present output O' to the user's terminal device 102 via output synthesizer 105.

Figure 3:
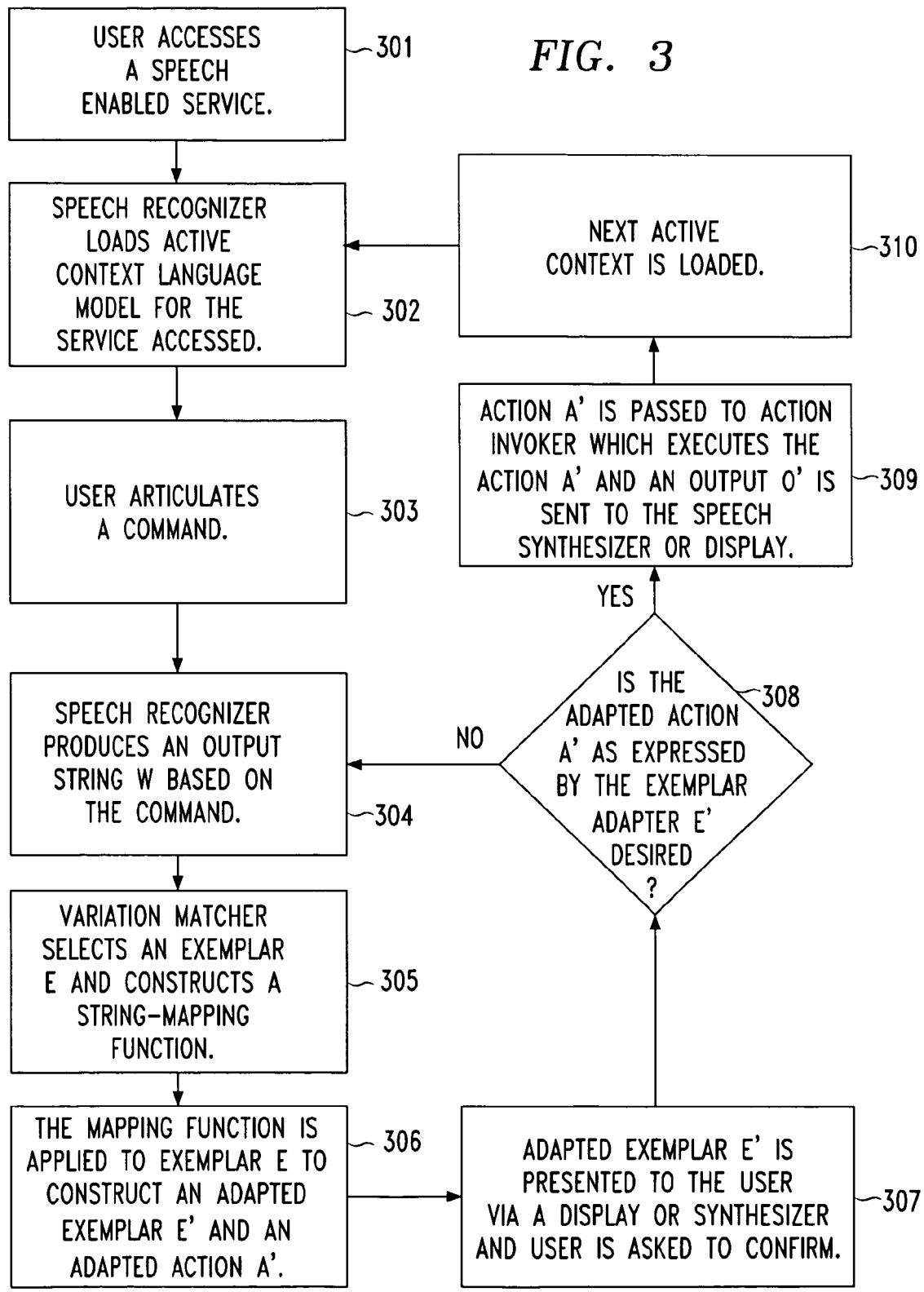
FIG. 3 is a flow chart illustrating a method in accordance with an embodiment of the present invention.

Now the operation of an exemplary embodiment of the present invention will be described with reference to FIG. 3. User 101 may access SLP 104 of a speech-enabled service in accordance with the present invention (301). Session manager 103 may cause speech recognizer 106 to load (or switch to) the language model L for the active context related to the application program serviced by the SLP 104 (302). The user 101 may be presented with a greeting via output synthesizer 105, and the user may respond by articulating a command into an input of terminal device 102 (303). The speech recognizer 106 may receive input S and produce an output data string W (304). The output data string W may be a transcription hypothesis of the user's command.

Variation matcher 107 is applied to W to select an exemplar E from the active context C and to construct a string-mapping function $\phi$ (305). The exemplar adjuster 110 applies the string-mapping function $\phi$ in order to construct an adapted exemplar E' and an adapted executable action A' (306). The system asks the user for confirmation to proceed with the sequence of actions A' by presenting the user (via the output synthesizer 105) the English expression E (307) and asking user 101 whether the adapted action A' as expressed by the adapted exemplar E is desired (308).

If the user selects, or says, "Yes," the session manager passes the adapted action A' to the action invoker which executes the action A' and returns any resulting output O' to the user via the output synthesizer 105 (309). The session manage may send this output (or a summary of it as appropriate) to the speech synthesizer or display. Based on the record (C, E, A, C') in active context specification, the active context for handling the next request by the user is changed to context C' associated with E in C, (310).

If in step 308, the user selects, or says, "No" indicating that the exemplar E' does not express the action desired by the user, the speech recognizer produces another output string W based on the command (304). In embodiments of the present invention, the speech recognizer 106 may produce another output string W that may be different form the previously created W. The variation matcher 107 may receive another output string W or may receive the same output string W and the variation matcher 107 may select another exemplar E' and mapping function φ'. The system may, for example, re-execute steps 306 through 308 to construct an adapted action A' and adapted exemplar E' that is desired by the user. In other embodiments of the present invention, the controller may ask the user to rephrase their request.

Figure 4B:
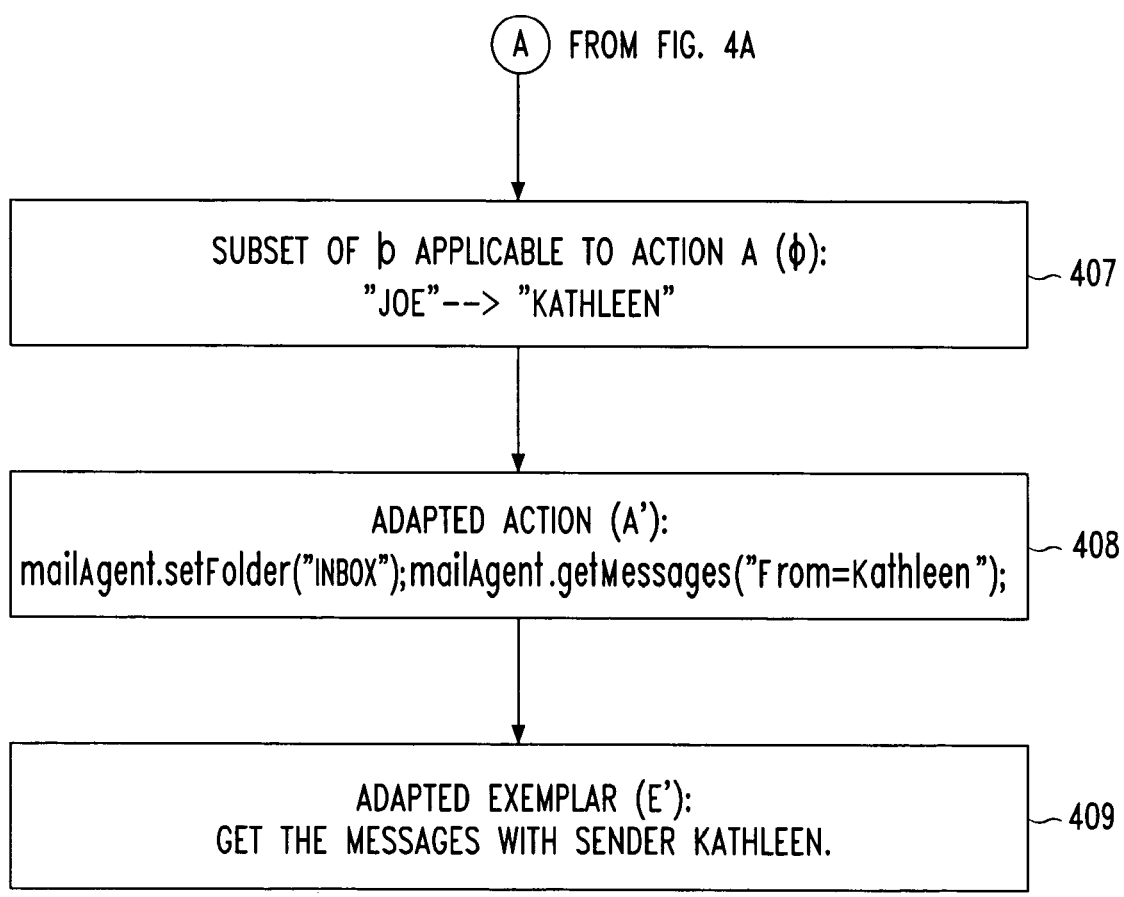

FIGS. 4A and 4B show a flow chart applying embodiments of the present invention to an exemplary speech-enabled e-mail service. A user may desire to retrieve e-mail messages and may log on via the Internet or call the speech-enabled e-mail service. The user may articulate speech into a microphone of, for example, the terminal device 102 or a telephone or other communication device (not shown). The controller 103 may load the active context language model for the speech-enabled e-mail service from variant database 108 of SLP 104.

The user's input may be converted to an electrical signal that is passed to the recognizer as an input command S. Input command S may be, fore example, "Was there anything new form Kathleen?" (401). Recognizer 106 may convert the command S into an output string W which may be interpreted as "Is there any thing new from Kathleen?" (402). As indicated above, the recognizer 106 may be susceptible to errors depending on the clarity of the input or other external or internal variations; thus, for example, "new" may be interpreted as "few" by recognizer 106. Variation matcher 107 takes the string W and attempts to find a suitable match from the variant database 108. Variation matcher may retrieve a stored variant V "is there anything from Joe?" (403).

Based on the variant V, the variant matcher 107 may retrieve exemplar E (e.g., Get the messages with sender Joe) that is associated with variant V of step 403 (404). Variant matcher 107 may construct a string mapping function φ, that expresses the difference between output string W of step 402 and variant V of step 403 (405). String mapping function φ indicates the insertion of the word "few" and the substitution of the word "Joe" by "Kathleen" (405). In embodiments of the invention, various known techniques may be implemented to determine string-mapping function φ.

Variation matcher 107 may select an action A as "{mailAgent.setFolder(INBOX); mailAgent.getmessages ("From=Joe")}" based on the exemplar E of step 404 (406). The action A of step 406 is an exemplary action expressed as line of code that the application program understands and may be able to execute. It is recognized that the line of code for action A is given by example only and that many different expressions can be written. A subset of string mapping function φ as applicable to action A ($φ_A$) is generated and may be applied to action A (407).

Adapted action A' may be generated by applying $φ_A$ to action A resulting in the line of code, for example, "{mailAgent.setFolder("INBOX); mailAgent.getmessages ("From=Kathleen")}" (408). Adapted exemplar E may generate, for example, "Get the messages with sender Kathleen" (409). The adapted exemplar E may be presented to the user; and if the user confirms that the user desires the adapted action A' as expressed by the exemplar E', the adapted action A' may be executed by API 114 of application program 115. Accordingly, messages from Kathleen, for example, may be presented to the user via output synthesizer 105.

Figure 5:
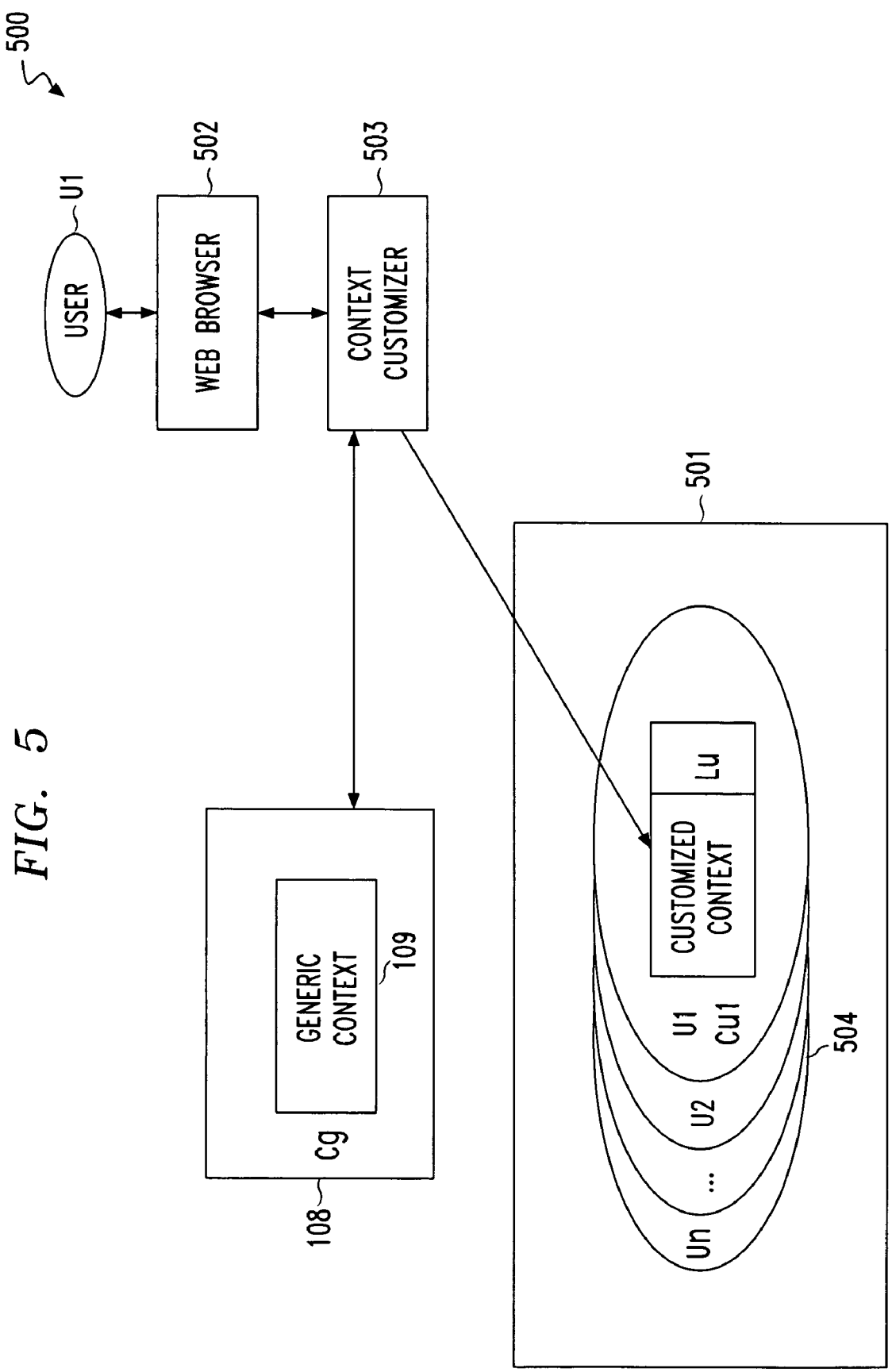
FIG. 5 is a diagrammatic representation of a customization module for use in the system as shown in FIG. 1.

Embodiments of the present invention may permit users to customize the variant database 108 so that they can create variants that closely represent the manner in which the user would articulate a particular action. FIG. 5 shows a block diagram showing a speech customization module 500 in accordance with embodiments of the present invention. The customization module 500 may be used to add personalized variants relating to stored exemplars E in variant database 108. Users 101 may use, for example, a known web browser 502 to access context customizer 503. Although a web browser is shown, a user may use a telephone or other suitable device to access context customizer 503.

Context customizer 503 may be coupled to variant database 108 and customizer server 501. Users of the system 100 may access the generic context files Cg 109 stored in variant database 108 and create customized content files 504 stored in a customization server 501. Generic context files Cg 109 may contain, for example, context identifier C, a variant V and corresponding exemplar E. Customization server 501 may contain customized context files 504 for a plurality of users U1-UN. Each customized file 504 may contain personalized context containing personalized variants (e.g., $V_1^1$, $V_1^2$ to $V_m^n$) personal to the user. User U1 may create one or more variants V corresponding to, for example, exemplar E. Thus, if the user U1 prefers to refer to a single action using varying commands, the user 101 may customize files 504 to reflect this preference. It is recognized that any language—for example, French, Spanish, etc. may be used in embodiments of the present invention.

In embodiments of the invention, user U1 may customize a context Cu1, adding the variants associated with C in the user's U1 personal variant database file 504 by composing natural language requests V and associating them with natural language requests or lists of request E which are taken from the exemplars E associated with context C.

The customization module 500 may permit a user to create and edit natural-language to natural-language (e.g., English-to-English) customization files stored, for example, on a server 501 using a standard HTTP browser. User U1 may be authenticated by the customization module 500 using known techniques and choosing an application, and within that a context C, to customize. In one embodiment, user may construct pairs of the form "When I say V1, I mean E" by choosing an exemplar E from among the available exemplars in C and entering a personalized variant V1 to be associated with that exemplar.

Once the user U1 customizes file 504 to reflect personalized variants, the resulting variants may be uploaded into variant database 104 in the form: (U1, V1, E, C), indicating that the customized variant V1 belongs to user U1 and is related to exemplar E in context C. Accordingly, when the user U1 uses system 100 of FIG. 1, the customized context will be available to the user U1 including the customized variants in addition to any variants that may already be present in the database for all users. In embodiments of the present invention, for subsequent customizations, the user may be presented with their own custom version of any context they have customized in the past. Additionally, users may be able to revert back to the generic context Cg when desired.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. In a speech-enabled service, a method for creating customized files containing personalized command variants relating to the speech-enabled service, the method comprising:
    accessing a context file relating to the speech-enabled service, the context file containing a natural language exemplar associated with a desired action and a variant associated with the natural language exemplar initialized by a developer of the context file;
    creating a customized variant for the desired action, wherein the customized variant is customized by a user and personal to the user;
    correlating the customized variant with the natural language exemplar; and
    storing the customized variant in a customized context file that is stored in a variant database in a communications network, wherein the variant database stores a plurality of customized context files for each one of a plurality of users, wherein the customized context file is used when the user uses the speech-enabled service.

2. The method of claim 1, wherein the customized variant represents one preferred way of the user of expressing the desired action.

3. The method of claim 2, wherein during service access by the user the customized context file is uploaded by the speech-enabled service allowing the user to express the desired action using the customized variant.

4. The method of claim 1, wherein the context file is accessed using a web browser.

5. The method of claim 1, wherein the context file is accessed using a telephone.

6. A non-transitory computer readable medium having stored thereon instructions that, when executed by a processor, causes the processor to perform a method for creating customized files containing personalized command variants relating to a speech-enabled service, comprising:
    accessing a context file relating to the speech-enabled service, the context file containing a natural language exemplar associated with a desired action and a variant associated with the natural language exemplar initialized by a developer of the context file;
    creating a customized variant for the desired action, wherein the customized variant is customized by a user and personal to the user;
    correlating the customized variant with the natural language exemplar; and
    storing the customized variant in a customized context file that is stored in a variant database in a communications network, wherein the variant database stores a plurality of customized context files for each one of a plurality of users, wherein the customized context file is used when the user uses the speech-enabled service.

7. The non-transitory computer readable medium of claim 6, wherein the customized variant represents one preferred way of the user of expressing the desired action.

8. The non-transitory computer readable medium of claim 7, wherein during service access by the user the customized context file is uploaded by the speech-enabled service allowing the user to express the desired action using the customized variant.

9. The non-transitory computer readable medium of claim 6, wherein the context file is accessed using a web browser.

10. The non-transitory computer readable medium of claim 6, wherein the context file is accessed using a telephone.

11. An apparatus for creating customized files containing personalized command variants relating to a speech-enabled service, comprising:
    means for accessing a context file relating to the speech-enabled service, the context file containing a natural language exemplar associated with a desired action and a variant associated with the natural language exemplar initialized by a developer of the context file;
    means for creating a customized variant for the desired action, wherein the customized variant is customized by a user and personal to the user;
    means for correlating the customized variant with the natural language exemplar; and
    means for storing the customized variant in a customized context file that is stored in a variant database in a communications network, wherein the variant database stores a plurality of customized context files for each one of a plurality of users, wherein the customized context file is used when the user uses the speech-enabled service.

12. The apparatus of claim 11, wherein the customized variant represents one preferred way of the user of expressing the desired action.

13. The apparatus of claim 12, wherein during service access by the user the customized context file is uploaded by the speech-enabled service allowing the user to express the desired action using the customized variant.

14. The apparatus of claim 11, wherein the context file is accessed using a web browser.

15. The apparatus of claim 11, wherein the context file is accessed using a Telephone.

* * * * *